US011217074B2

United States Patent
Kim et al.

(10) Patent No.: US 11,217,074 B2
(45) Date of Patent: *Jan. 4, 2022

(54) SYSTEM AND METHOD OF COMMUNICATING DEVICES USING VIRTUAL BUTTONS

(71) Applicant: HELLOFACTORY CO., LTD., Seoul (KR)

(72) Inventors: Kyungmin Kim, Seoul (KR); Hyun Jip Kim, Seoul (KR)

(73) Assignee: HELLOFACTORY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,241

(22) Filed: Sep. 14, 2020

(65) Prior Publication Data

US 2021/0043054 A1 Feb. 11, 2021

Related U.S. Application Data

(63) Continuation of application No. 16/104,858, filed on Aug. 17, 2018, now Pat. No. 10,803,716, which is a (Continued)

(30) Foreign Application Priority Data

Sep. 8, 2017 (KR) .......................... 10-2017-0115273

(51) Int. Cl.
*G08B 7/06* (2006.01)
*G06Q 30/02* (2012.01)
(Continued)

(52) U.S. Cl.
CPC .......... *G08B 7/068* (2013.01); *G06F 3/0482* (2013.01); *G06F 3/04886* (2013.01);
(Continued)

(58) Field of Classification Search
CPC ........ G08B 7/068; G06Q 30/02; G06Q 50/12; G06F 3/04886; G06F 3/0482;
(Continued)

(56) References Cited

U.S. PATENT DOCUMENTS 10,255,645 B1 * 4/2019 Christensen ........... G06Q 20/14
2004/0158494 A1   8/2004 Suthar
(Continued)

FOREIGN PATENT DOCUMENTS

KR  10-2012-0074271    7/2012
KR  10-2014-0077998    6/2014
(Continued)

OTHER PUBLICATIONS

Definition of menu (article) [online]. Merriam-webster.com. Archived Aug. 18, 2017. Retrieved on Apr. 28, 2021. https://www.merriam-webster.com/dictionary/menu (Year: 2017).*

(Continued)

*Primary Examiner* — John T Repsher, III
(74) *Attorney, Agent, or Firm* — Ladas & Parry, LLP

(57) ABSTRACT

A method of communicating devices using virtual buttons comprises receiving, by a user device, a store code and transmitting, by the user device, the store code to a server; searching, by the server, for virtual buttons corresponding to the store code, and transmitting, by the server, to the user device the virtual buttons corresponding to the store code; providing, by the user device, an interface configured to receive a location identifier and button selection input among the virtual buttons received from the server, and transmitting, by the user device, the location identifier and the button selection input to the server; transmitting, by the server, to a staff device the location identifier and the button selection input; and receiving, by the staff device, the location identifier and the button selection input and dis-
(Continued)

playing information associated with the location identifier and requested service corresponding to the button selection input.

19 Claims, 13 Drawing Sheets

Related U.S. Application Data continuation of application No. PCT/KR2017/009924, filed on Sep. 11, 2017.

(51) Int. Cl.
| | |
|---|---|
| *G06Q 50/12* | (2012.01) |
| *G06F 3/0488* | (2013.01) |
| *G06F 3/0482* | (2013.01) |
| *G06K 7/14* | (2006.01) |
| *H04W 4/021* | (2018.01) |
| *H04W 4/80* | (2018.01) |
| *G06K 7/10* | (2006.01) |
| *H04W 4/33* | (2018.01) |

(52) U.S. Cl.
CPC ....... *G06K 7/10386* (2013.01); *G06K 7/1417* (2013.01); *G06Q 30/02* (2013.01); *G06Q 50/12* (2013.01); *H04W 4/021* (2013.01); *H04W 4/33* (2018.02); *H04W 4/80* (2018.02)

(58) Field of Classification Search
CPC . G06K 7/1417; G06K 7/10386; H04W 4/021; H04W 4/80; H04W 4/33
See application file for complete search history.

(56) References Cited

U.S. PATENT DOCUMENTS

| | | | | |
|---|---|---|---|---|
| 2006/0186197 | A1* | 8/2006 | Rosenberg | G06Q 50/12 235/380 |
| 2012/0050019 | A1* | 3/2012 | Castro | G08B 3/1016 340/286.09 |
| 2013/0191229 | A1* | 7/2013 | Rodgers | G06Q 30/06 705/15 |
| 2014/0025513 | A1 | 1/2014 | Cooke et al. | |
| 2014/0156319 | A1* | 6/2014 | Deeb | G06Q 30/06 705/5 |
| 2014/0337099 | A1* | 11/2014 | Ignacio | G06Q 30/016 705/7.32 |
| 2018/0260808 | A1 | 9/2018 | Calderone et al. | |

FOREIGN PATENT DOCUMENTS

| | | |
|---|---|---|
| KR | 10-2014-0083446 | 7/2014 |
| KR | 10-1593490 | 2/2016 |
| KR | 10-2016-0050243 | 5/2016 |
| KR | 10-2016-0123195 | 10/2016 |

OTHER PUBLICATIONS

International Search Report for PCT/KR2017/009924 dated Feb. 28, 2018 and its English machine translation by Google Translate (published as WO/2019/050072).
Written Opinion of the International Searching Authority for PCT/KR2017/009924 dated Feb. 28, 2018 and its English machine translation by Google Translate (published as WO/2019/050072).
Non-Final Office Action dated Aug. 29, 2019 for U.S. Appl. No. 16/104,858 (now published as U.S. 2019/0080572).
Final Office Action dated Dec. 11, 2019 for U.S. Appl. No. 16/104,858 (now published as U.S. 2019/0080572).
Notice of Allowance dated Jun. 9, 2020 for U.S. Appl. No. 16/104,858 (now published as 2019/0080572).

\* cited by examiner

SYSTEM AND METHOD OF COMMUNICATING DEVICES USING VIRTUAL BUTTONS

CROSS-REFERENCE TO RELATED APPLICATIONS

This application is a continuation of International Patent Application No. PCT/KR2017/009924 filed on Sep. 11, 2017, which claims the priority to Korean Patent Application No. 10-2017-00115273 filed with the Korean Intellectual Property Office on Sep. 8, 2017, in which the entire contents are incorporated herein by reference.

TECHNICAL FIELD

Various embodiments of the present disclosure generally relate to a system and method of communicating devices using virtual buttons, particularly, paging a store staff, making an order, and transferring a request by using virtual buttons displayed on a user device. More particularly, some embodiments of the present disclosure may relate to a system and method of transmitting a paging signal and transferring service request when paging a staff in a store by using a virtual button application or web including one or more virtual buttons corresponding to service contents for each store.

BACKGROUND

In order to page staffs or managers or request service in places, such as restaurants, hospitals, hotels, etc., a paging button may be used. Herein, as a method of operating a paging button, a RF (AM or FM) signal transmission method, a method of transmitting a beacon signal based on a low power Bluetooth technique, etc. may be used. However, a conventional method of paging a staff in a store by using a paging button merely transfers a paging signal without notifying the reason of the paging request, thus providing service and corresponding to the paging request is provided in various steps. For example, when a customer pages a staff, the staff moves to the table where the customer is located, and receives a service request from the customer. Then, to provide the corresponding service, the staff moves again to the table where the customer is located. As described above, when a staff is called out in the store by using a conventional method, unnecessary time and cost are required.

DOCUMENTS OF RELATED ART

Patent Document (Patent Document 1) Korean Patent Application Publication No. 10-2012-0074271

SUMMARY

Some embodiments of the present disclosure may provide a method and system capable of providing one or more virtual buttons to a user device to transmit a paging signal and a service request requested by the user in the paging signal when a customer present in a specific store pages a staff by using a paging button or one or more virtual buttons without using an additional hardware.

According to various embodiments of the present disclosure, a method of communicating devices using virtual buttons may comprise: receiving, by a user device, a store code and transmitting, by the user device, the store code to a server; searching, by the server, for virtual buttons corresponding to the store code received from the user device, and transmitting, by the server, to the user device the virtual buttons corresponding to the store code received from the user device, wherein each of the virtual buttons has a corresponding service request; providing, by the user device, an interface configured to receive a location identifier and button selection input among the virtual buttons received from the server, and transmitting, by the user device, the location identifier and the button selection input to the server; transmitting, by the server, to a staff device the location identifier and the button selection input; and receiving, by the staff device, the location identifier and the button selection input and displaying information associated with the location identifier and requested service corresponding to the button selection input.

In some embodiments, the location identifier may be a table number.

In certain embodiments, the method may further comprise receiving, by the user device, the location identifier by performing wireless communication tagging or scanning a machine-readable code.

In certain embodiments, the method may further comprise receiving, by the user device, the store code included in a beacon signal generated by a Bluetooth signal generator.

In various embodiments, the method may further comprise transmitting, by a paging button, the location identifier to the user device.

In some embodiments, the method may further comprise displaying, by the user device, a screen requesting a wireless communication tagging and receiving by the user device, the location identifier or a paging button identifier by performing the wireless communication tagging with a paging button.

In certain embodiments, the method may further comprise displaying, by the user' device, a screen requesting to scan a machine readable code associated with the location identifier, and receiving, by the user device, the location identifier from a paging button when the machine readable code is scanned.

In various embodiments, the method may further comprise: transmitting, by a paging button, to the user device a signal including the store's code and/or the location identifier; and transmitting, by the user device, to the server the button selection input and the location identifier when one of the virtual buttons is selected by a user.

In some embodiments, the method may further comprise displaying or providing, by the user device, the virtual buttons that the user can select an interface enabling a user to input a service request by way of typing or with voice.

In certain embodiments, the method may further comprise: when one of the virtual buttons is selected, changing, by the user device, the selected one of the virtual button to be distinguished from the virtual buttons which are not selected; and displaying, by the user device, a status of the requested service corresponding the button selection input on one of the virtual buttons selected by a user.

According to various embodiments of the present disclosure, a system for communicating devices requesting a service using virtual buttons may comprise of: a user device configured to: transmit a store code to a server and receive from the server virtual buttons corresponding to the store code, wherein each of the virtual buttons has a corresponding service request, provide an interface configured to receive a location identifier and button selection input among the virtual buttons received from the server, and transmit the location identifier and the button selection input to the server; the server configured to: search for the virtual buttons corresponding to the store code received from the user device, transmit the virtual buttons corresponding to the store code to the user device, and transmit to a staff device the location identifier and the button selection input received from the user device; and the staff device configured to receive from the server the location identifier and the button selection input and display information associated with the location identifier and requested service corresponding to the button selection.

In some embodiments, the location identifier may be a table number.

In certain embodiments, the system may further comprise a signal generator configured to transfer the store code to the user device.

In various embodiments, the system may further comprise a paging button configured to transmit the location identifier to the user device.

In some embodiments, the system may further comprise a paging button configured to perform wireless communication tagging. The user device may be configured to display a screen requesting the wireless communication tagging and receive the location identifier by performing the wireless communication tagging with the paging button.

In certain embodiments, the system may further comprise a machine readable code associated with the location identifier. The user device may be configured to display a screen requesting to scan the machine readable code and receive the location identifier from the paging button when the machine readable code is scanned.

In various embodiments, the system may further comprise a paging button configured to transmit to the user device a signal including the store code and/or the location identifier. The user device may be configured to transmit to the server the button selection input and the location identifier when one of the virtual buttons is selected by a user.

In certain embodiments, the user device may be configured to display the virtual buttons that the user can select and provide an interface enabling a user to input a service request by way of typing or with voice.

In some embodiments, the user device may be configured to, when one of the virtual buttons is selected, change the selected one of the virtual buttons to be distinguished from the virtual buttons which are not selected.

In various embodiments, the user device may be configured to display a status of the requested service corresponding the button selection input on one of the virtual buttons selected by a user.

According to an embodiment of the present invention, a system for requesting service by using a virtual button may include: a Bluetooth signal generator transferring a store code to a user device; a user device executing a virtual button application, retransmitting the store code to a server when receiving the store code while the virtual button application is being operated, receiving from the server virtual buttons in association with the store code, displaying an operation requesting screen for receiving a table number when one button is selected from the virtual buttons, and receiving the table number and button selection information and providing the same to the server; a server searching for virtual buttons in association with the store code received from the user device and transmitting the same to the user device, and transmitting to a staff device the table number, the button selection information when the same is received; a staff device receiving from the server the table number and the button selection information; and a paging button transmitting the table number to the user device.

According to an embodiment of the present invention, a method of requesting a service may include: executing, by a user device, a virtual button application; receiving, by the user device, a store code included in a beacon signal generated by a Bluetooth signal generator; searching, by a server, to store virtual button information corresponding to the store code when the store code is received from the user device; transmitting, by the server, the retrieved virtual button information to the user device; displaying, by the user device, an operation requesting screen for receiving a table number when a specific button is selected by a user from a screen where the store's virtual buttons information are displayed; receiving, by the user device, the table number by performing NFC tagging or capturing QR code; transmitting, by the user device, the received table number and button selection information to the server; and transmitting, by the server, to a staff device the table number and the button selection information.

In some embodiments of the present disclosure, unnecessary movement and time may be not needed since a paging object is transferred together when a customer present in a store pages a store staff. In certain embodiments, requests can be directly transferred by using an application installed on a user device so that, in a store, additional hardware and installation on a table are not required.

In some embodiments of the present disclosure, a paging button customized to each store may be applied to various businesses and a store side can change requests that are displayed on a virtual button according to a feature of the store.

DETAILED DESCRIPTION OF EMBODIMENTS

Hereinafter, preferred embodiments according to the present invention will be described in detail with reference to the accompanying drawings. The detailed description set forth below in conjunction with the appended drawings is intended to illustrate exemplary embodiments of the invention and is not intended to represent the only embodiments in which the invention may be practiced.

However, the present invention is not limited to the exemplary embodiments set forth below and may be embodied in various other forms. The present exemplary embodiments are for rendering the description of the present invention complete and are set forth to provide a complete understanding of the scope of the invention to a person with ordinary skill in the technical field to which the present invention pertains and the present invention will only be defined by the scope of the claims.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Through the whole document, the term, "comprising or including," used in the document means that one or more other components, steps, operation and/or existence or addition of elements are not excluded in addition to the described components, steps, operation and/or elements unless the context dictates otherwise.

In addition, in the following description, terms such as, "unit" and "module," indicate a unit for processing at least one function or operation, wherein the unit and the block may be embodied as hardware or software or embodied by combining the hardware and software. As used in the specification and appended claims, the terms, "a", "an", "one", "the" and other similar terms include both singular and plural forms, unless context clearly dictates otherwise.

Specific terminologies used for the embodiments of the present invention may be provided to help the understanding of the present invention. Unless differently defined, all terms used herein including the technical or scientific terms, have the same meanings as the terms generally understood by those skilled in the art to which the present invention pertains. Moreover, the use of the specific terminology may be modified into other forms within the scope of the technical idea of the present invention.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the present invention.

Figure 1:
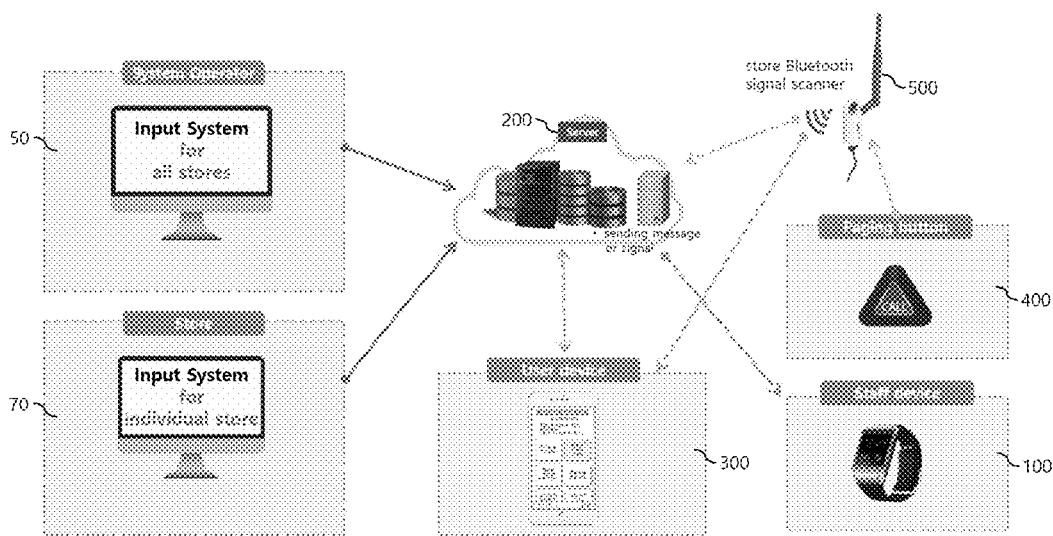
FIG. 1 shows a configuration diagram of a paging system using a virtual button according to an embodiment of the present disclosure.

FIG. 1 shows a configuration diagram of a paging system using a virtual button according to an embodiment of the present disclosure.

Referring to FIG. 1, a wired and/or wireless communication environment or system may be configured by including one or more staff devices 100, a server 200, a user device 300, a paging button 400, and a store signal generator 500.

In some exemplary embodiments of a wired and/or wireless communication network environment or system, at least one user device, at least one staff device, at least one paging button, at least one store signal generator, at least one server, and at least one network may be present, and at least one user device and a server may be connected by using other networks, although such is not required.

In the embodiment of the present disclosure, the staff device 100 and the user device 300 can be any device capable of transmitting and receiving communication signals, and the staff device 100 and the user device 300 may be or include all devices capable of transmitting and receiving connection information through a wired or wireless router.

At least one program or application may be installed in the staff device 100 and/or user device 300. In certain embodiments of the present disclosure, an application or program may include an application program interface (API) or embedded software which is related to receiving or transmitting a paging signal, including service requests and providing a virtual button.

The staff device 100 and the user device 300 may transmit and receive data or signal to and from the server 200 by itself or by using at least one program or application installed therein. The transmitted or received data or signal may be a service requesting signal associated with a virtual button.

The user device 300 may include, for example, but not limited to, at least one of a smartphone, a personal computer (PC), a laptop computer, a tablet PC, a mobile phone, a video phone, an electronic book reader (E-book reader), a mobile medical device, a camera, a wearable device, a terminal, a mobile station (MS), a mobile subscriber station (MSS), a subscriber station (SS), an advanced mobile station (AMS), a wireless terminal (WT), machine-type communication (MTC) device, a machine-to-machine (M2M) device, a device-to-device (D2D) device and any electronic device with wireless or wired communication function.

The staff device 100 may include a wearable or portable device, although such is not required. According to various embodiments, the wearable device may include, for example, but not limited to, at least one of an accessory-type wearable device (for example, watches, rings, bracelets, anklets, necklaces, glasses, contact lenses, or head-mounted-devices (HMD)). These are mere examples and a user device can be all devices that are currently developed, commercialized, or are capable of transmitting data or signals in addition to the above-mentioned examples.

The server 200 may be or include an object or apparatus capable of transmitting and receiving data to and from other device(s) by using a wired or wireless communication environment or system. The server 200 may further include at least one of a relay server, an intermediate server, and a client server.

The server 200 may be or include a cloud server, an IP multimedia subsystem (IMS) server, a telephony application server, an instant messaging (IM) server, a media gateway control function (MGCF) server, a messaging gateway (MSG) server, a call session control function (CSCF) server. The server 200 may be implemented in a device referring to an object capable of transmitting and receiving signal or data, such as a personal computer (PC), laptop computer, tablet PC, etc.

A network may be or include, for example, but not limited to, a data communication network for transmitting and receiving data between the staff device 100, user device 300, and server 200.

For example, the network may be an Internet Protocol (IP) network providing transmission and reception service of large-scale data by using an IP or another all-IP network where other IP networks are combined.

In the exemplary embodiment shown in FIG. 1, the server 200 may perform communication with the system operator 50. The system operator 50 may input information to the server 200 or edit information of the server 200 to operate the overall management of the server 200. In addition, the system operator 50 may manage versions update of an application, and transfer edited information to the server 200. Additionally, the system operator 50 may be implemented as an input system for all stores registered on the server 200, and manage each store by using the same. For example, the system operator 50 may generate common buttons for the entire stores in advance and store corresponding information on the server 200. Then, according to various embodiments, the system operator 50 may generate virtual buttons for events or advertisement according to a request of a store side and provide the same. In addition, the system operator 50 may generate a basic format enabling a store 70 to set virtual buttons and provide the same to the server 200.

By using a basic format provided from the system operator 50, an individual store side may input or edit information to the server 200. An individual store 70 may edit and remove information in the server 200 or register new information to the server 200 under the authority assigned to that individual store 70. For example, the store 70 may remove a part of virtual buttons that are fundamentally provided, generate a virtual button including service contents that is frequently required in a store, and store the changed information on the server 200.

Figure 2:
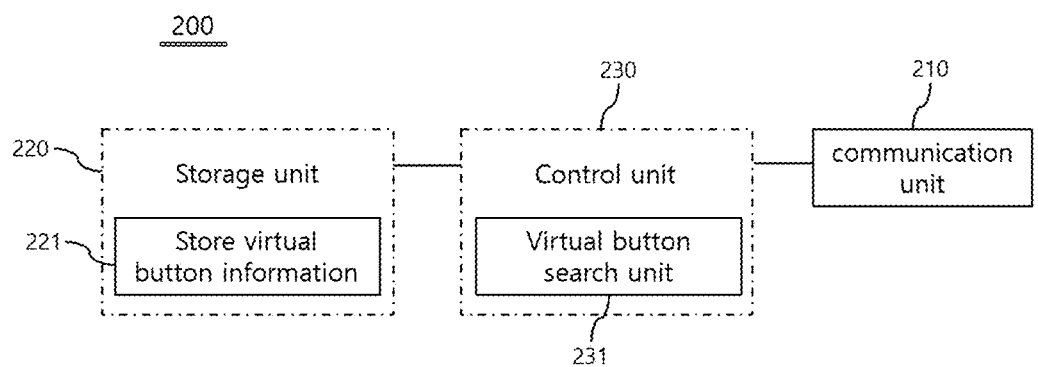
FIG. 2 shows a block diagram of a server according to an embodiment of the present disclosure.

FIG. 2 shows a block diagram of a server according to an embodiment of the present disclosure.

The server 200 may include one or more of a communication unit 210, a storage unit 220, and a control unit 230. The storage unit 220 may store virtual button information 221, and the control unit 230 may comprise a virtual button search unit 231.

The communication unit 210 may perform communication between the staff device 100 and user device 300. When the communication unit 210 receives an input signal of the virtual button from the user device 300, the communication unit 210 may transmit a location identifier, such as a table number and paging button ID (corresponding to a table number), and button selection information, which are received from the user device 300, to the staff device 100 of the store associated with the received input signal. In addition, the user device 300 may send information related to a store where a user is currently present and/or a user's current location, and the communication unit 210 may receive store information of a store where a user is currently present when the user accesses the server 200 by using a virtual button application. In addition, the communication unit 210 may transmit virtual button information generated, by control of the control unit 230, by a store side where the user is located to the user device 300. Accordingly, the user may check one or more virtual buttons of the store where the user is present in the application of the user device 300.

The storage unit 220 may store operating systems, applications and general files. For example, the storage unit 220 may store files related to providing a virtual button application to the user device 300 and operating system(s). According to an embodiment of the present invention, the storage unit 220 may store virtual button information 221. The store virtual button information 221 may be generated by reflecting contents set in each store.

The control unit 230 may control overall operations performed on the server 200. The control unit 230 and/or the communication unit 210 may be implemented as a processor, a controller, a microcontroller, a microprocessor, a microcomputer, etc. Meanwhile, the control unit 230 and/or the communication unit 210 may be implemented in the hardware or firmware, software, or in a combination thereof.

When the control unit 230 and/or the communication unit 210 are implemented in the form of firmware or software, the method according to the embodiments of the present disclosure may be implemented in the form of a module, procedure, or function performing the above or below described functions or operations. The storage unit 220 may store software codes and the control unit 230 may drive the software codes stored in the storage unit 220. Herein, the storage unit 220 may be located inside or outside of the user device 300 and the server 200, and the storage unit 220 may transmit and receive data to and from the control unit 230 by using a wide range of methods that have already been disclosed or commercialized.

The control unit 230 may determine store information where the user device 300 executing a virtual button application is positioned by using, for example, but not limited to, information related to the location of the user device 300 or store information sent from the user device 300, and search and retrieve store virtual button information 221 in association with the corresponding store. In addition, the control unit 230 may transfer retrieved store virtual button information 221 to the user device 300 so as to support a user to use virtual buttons associated with the store. In addition, a user using a virtual button application may request service to a store by pressing a virtual button in the virtual button application. The virtual button application may transmit a signal for the user's request to the server 200 and the control unit 230 may receive the signal for the user's request and transmit the signal for the user's request to a staff device of the store.

Figure 3:
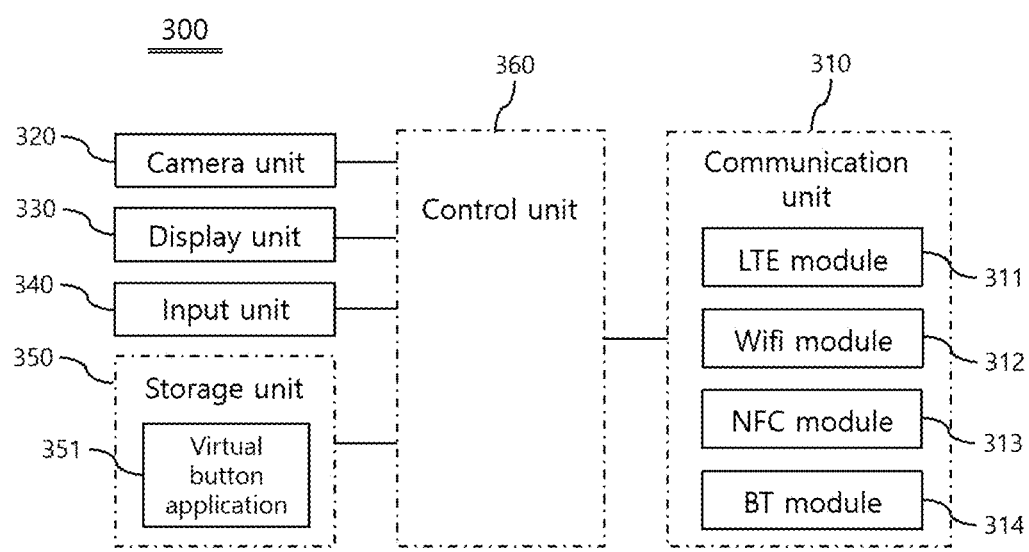
FIG. 3 shows a block diagram of a user device according to an embodiment of the present disclosure.

FIG. 3 shows a block diagram of a user device according to an embodiment of the present disclosure.

A user device 300 may include one or more of a communication unit 310, an image capturing unit 320, a display unit 330, an input unit 340, a storage unit 350, and a control unit 360. The storage unit 350 may store a virtual button application 351.

The communication unit 310 may perform wired/wireless communication with at least one of other electronic devices and a server. The communication unit 310 may receive information of a store code, paging button ID, etc. which is provided from the store, and perform communication with the server 200. The communication unit 310 may include a wireless mobile communication module 311, for example, but not limited to, an LTE module and a 5G module. In addition, the communication unit 310 may include at least one of, for example, but not limited to, long-term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), any wireless mobile communication etc., as a cellular communication protocol. The communication unit 310 may include a module performing short distance communication or near field communication. The module performing short distance communication or near field communication may be or comprise one or more of a wireless fidelity (WiFi) module 312, a near field communication (NFC) module 313, and a Bluetooth module 314. In addition, the communication unit 310 may further include, although it is not shown in the figure, a global navigation satellite system (GNSS). The GNSS may include at least one of, for example, but not limited to, a global positioning system (GPS), a global navigation satellite system (Glonass), a Beidou Navigation Satellite System (Beidou), and a European global satellite-based navigation system (Galileo), according to a use area, a bandwidth, or the like. In the present disclosure, the term, "GPS," may be interchangeably used with the term "GNSS." In some exemplary embodiment of the present disclosure, a wired communication may include at least one of, for example, but not limited to, universal serial bus (USB), high definition multimedia interface (HDMI), recommended standard232 (RS-232), and plain old telephone service (POTS). The network may include at least one of communication networks, such as a computer network (for example, a local area network (LAN), or a wide area network (WAN)), the Internet, and a telephone network, or the like.

The image capturing unit or camera unit 320 may be a device that is capable of capturing, for example, a still image and a video image. In certain embodiments of the present disclosure, the image capturing unit or camera unit 320 may include at least one image sensor (for example, a front or rear sensor), a lens, an image signal processor (ISP), or a flash (for example, LED or xenon lamp).

The image capturing unit or camera unit 320 may capture or scan a machine-readable code, for example, but not limited to, a QR code, provided by or at a store, and transfer image information or data, such as the captured QR code, to the control unit 360. The QR code may be used for executing a virtual button application or for transmitting a service request corresponding to a specific button selected by a user from a virtual button application.

The display unit 330 may include, for example, but not limited to, a liquid crystal display (LCD), light emitting diode (LED) display, an organic light emitting diode (OLED) display, a micro electro mechanical system (MEMS) display, or an electronic paper display. The display unit 330 may display various types of contents (for example, text, images, videos, icons, or symbols) for users. The display unit 330 may include a touch screen and/or a sensor, and receive the user's input, for example, a touch input, a gesture input, a proximity input, or a hovering input using an electronic pen or a user's body part. In addition, the display unit 330 may be configured or implemented to be flexible, transparent, or wearable.

The input unit 340 may receive input from the user or other device and transfer a command or data input from the user or an external device to at least one of other elements of the user device 300. The input unit 340 may include, for example, but not limited to, a touch panel, a (digital) pen sensor, a key, or a microphone. The touch panel may be at least one selected from among a capacitive touch panel, a resistive touch panel, an infrared touch panel, and an ultraviolet touch panel. In addition, the touch panel may further include a control circuit. The touch panel may further include a tactile layer configured to provide a tactile response to a user. The (digital) pen sensor may be a part of the touch panel or may include a separate recognition sheet. The key may include a physical button, an optical key, or a keypad. The input unit 340 may include a microphone for inputting a user voice and other sounds. When the input unit 340 includes the touch screen, the input unit 340 may also perform a function of the display unit 330 in one area.

The input unit 340 may receive a selection input of a user who has selected a virtual button. In addition, the input unit 340 may receive a text input that is input by the user when the user wants to directly input his or her requests while the virtual button application 351 is running. Additionally, the input unit 340 may receive a voice input or an articulation message of the user by using a microphone when the user wants to directly input his or her requests with voice while a virtual button application 351 is running and transfer the user's input to the control unit 360.

The storage unit 350 may include an internal or external memory. The internal memory may include at least one selected from among a volatile memory, a non-volatile memory, a flash memory, and hard disk drive (HDD). The external memory may include a flash drive, for example, compact flash (CF), secure digital (SD), micro secure digital (micro-SD), mini secure digital (mini-SD), extreme digital (xD), multi-media card (MMC), or memory stick. The external memory may be functionally or physically or both connected to the electronic devices via various interfaces.

The storage unit 350 may store a virtual button application 351. The storage unit 350 may temporarily store the store code information within the beacon information that is received from a Bluetooth signal generator installed in the store when a user device has been moved to a specific store.

The control unit 360 may control overall operations of the user device 300. In some embodiments of the present disclosure, the control unit 360 may control operation related to executing a virtual button application 351. For example, the control unit 360 may control to transmit or transfer a store code to the server 200 when the store code is transmitted from a store Bluetooth signal generator to the user device 300. Then, the server 200 may search for store virtual buttons corresponding to the store code transmitted from the user device 300 and transmit the searched the store virtual buttons to the user device 300. The control unit 360 may control the display unit 330 to display the store virtual buttons received from the server 200.

In addition, when a user selects a specific virtual button while the virtual button application is running, the control unit 360 may perform a series of operations for transferring to a staff device a service requesting message associated with the button selected by the user in the virtual button application.

Figure 4:
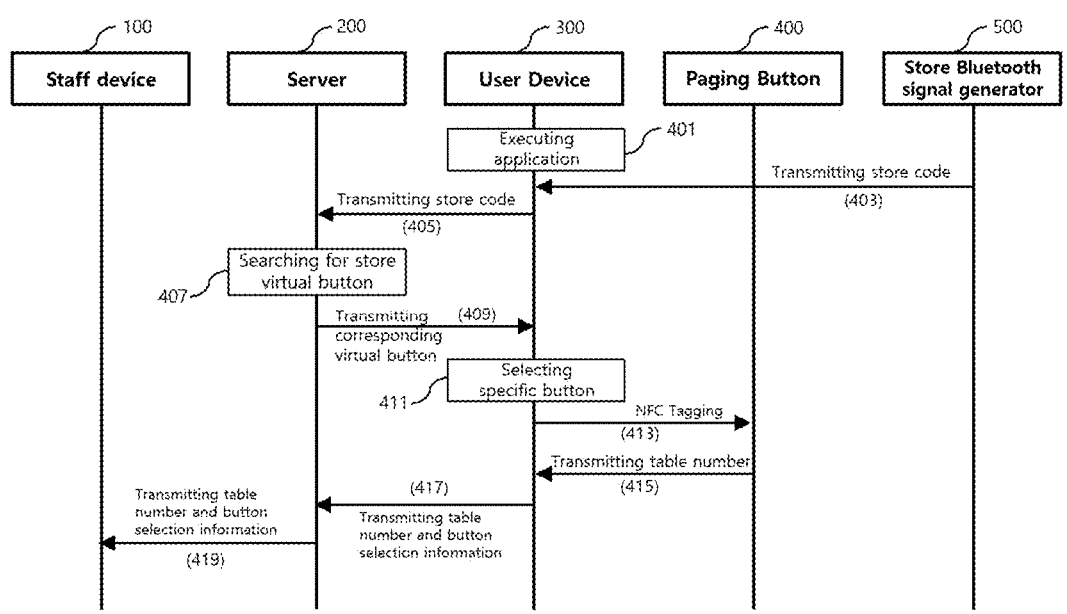
FIG. 4 shows a flowchart of a method for paging a store staff by using a virtual button application according to an embodiment of the present disclosure.

FIG. 4 shows a flowchart of a method for paging a store staff by using a virtual button application according to an embodiment of the present disclosure.

Referring to FIG. 4, a service requesting system using a virtual button application may include one or more of a staff device 100, a server 200, a user device 300, a paging button 400, and a store Bluetooth signal generator 500.

An exemplary embodiment of an order of using a virtual button will be described below. First, the user device 300 may perform operation 401 of executing a virtual button application. Herein, it is assumed that the user has entered or is in a specific store or the user is present within a signal range of the store Bluetooth signal generator 500. In addition, the store Bluetooth signal generator 500 may transfer a beacon signal to devices present within a signal range at a predetermined temporal interval. Herein, the beacon signal may perform a function of displaying messages on a user device associated with a store related application (for example, membership app). In an embodiment of the present disclosure, the store Bluetooth signal generator 500 may transmit to the user device 300 a beacon signal, including a store code.

However, according to certain embodiments of the present disclosure, even when the Bluetooth signal generator 500 is not present, a store code may be transferred to the user device 300 by using various methods. For example, the user device 300 may receive the store code from a device transmitting data by way of NFC. Herein, the user device 300 may perform NFC communication by being physically in contact with the device or approaching the device without contact. One or more devices performing the NFC communication may be positioned at one or several areas of the store, or may be provided at each table. Alternatively, a device transmitting a store code by using an NFC communication may be, for example, a paging button.

In addition, the user device 300 may receive the store code by using various methods, for example, but not limited to, recognizing a QR code provided within the store.

When the user device 300 receives the store code, the user device 300 may perform operation 405 of transmitting the received store code to the server 200. The server 200 may provide a virtual button application.

After the above operation, the server 200 may perform operation 407 of searching for a store virtual button among the plurality of store virtual buttons based on the received store code. Herein, the server 200 may perform operation 409 of transmitting to the user device 300 a virtual button associated with the received store code. According to the above operation, for example, the user device 300 may receive and/or display a message that the corresponding store has been recognized after the virtual button application is executed and the store code is transmitted and the display unit 330 of the user device 300 may display a virtual button image of the corresponding store.

The user device 300 may receive one or more virtual buttons of the corresponding store transferred from the server 200 and the user device 300 may display one or more virtual buttons on a screen of the user device 300. Then, the user performs operation 411 of selecting a specific button among the virtual buttons displayed on the user device 300 and performs operation 413 of performing NFC tagging by approaching the user device 300 to the paging button 400 of or in the store. For example, NFC tagging operation may be performed by an NFC module included in the paging button 400. In operation 415, the paging button 400 may transfer ID information of the paging button 400 or a location identifier, such as a table number corresponding to the paging button 400, to the user device 300. For example, the operation 415 may be performed by the NFC module.

In some embodiments of the present disclosure, the user device 300 may recognize the contact or tagging between the user device 300 and the paging button 400 as an input or confirmation for paging a store staff by using the virtual button. Accordingly, when the user device 300 receives the user's button selection input of a specific button selected from the virtual buttons displayed on a screen of the user device 300, the user device 300 may not transmit a signal corresponding to the user's button selection input immediately to the server 200 and may transmit the signal to the server 200 when the user device 300 is contacted or tagged to the paging button 400 provided on the table, although such is not required.

Accordingly, when the user device 300 receives a paging button ID associated with a table number that is in contact with the user device 300, the user device 300 may perform operation 417 of transmitting a location identifier, such as a table number and the received paging button ID, and/or button selection information (for example, give me some water) to the server 200. In addition, the server 200 may perform operation 419 of transmitting to the staff device 100 the received paging button ID (or a table number) and button selection information.

In addition, service requesting operation using a virtual button may be performed by using various exemplary embodiments of signal transferring order. For example, when a user enters the store and sits at a specific table, the user may receive a store code and information corresponding to the table number by performing NFC tagging, receiving a beacon signal generated by the paging button, or by recognizing a QR code. When the user inputs a service request, the user device 300 may perform paging a staff and/or service request transmission by receiving or detecting touch of a specific virtual button on a virtual button application without being in contact with the paging button 400. According to various embodiments, the paging system may comprise a device transmitting a table number by performing NFC tagging with the user device 300 or various near field communication methods (for example, receiving a beacon signal using a Bluetooth, Zigbee communication, etc.) may be the paging button 400 provided on the table. In some embodiments, a QR code in a sticker form may be present at one side of the paging button 400 or at the table and the user device 300 may receive a table number by recognizing or scanning the QR code.

Figure 5:
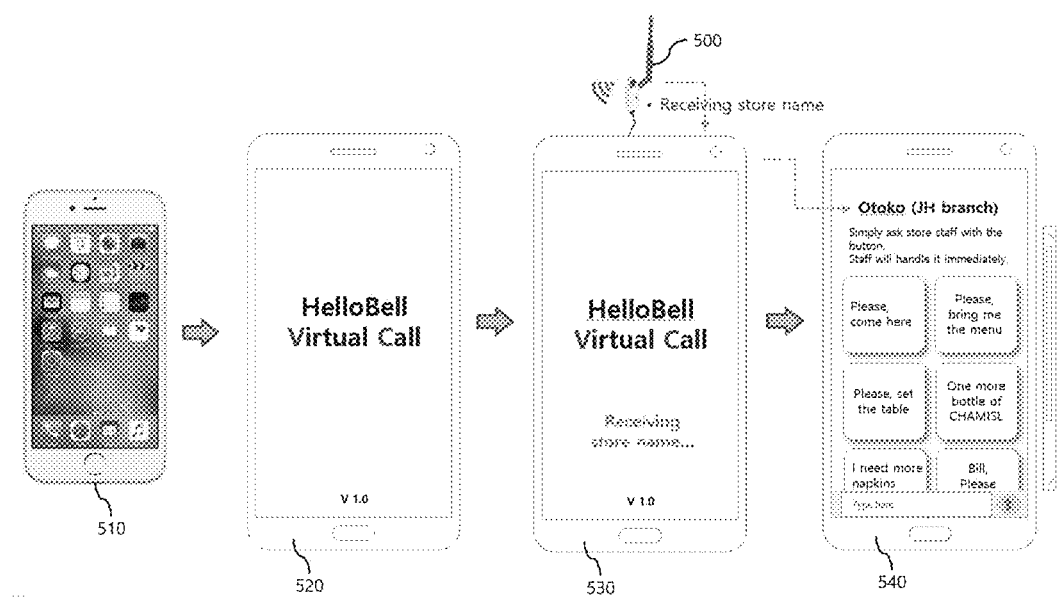
FIG. 5 shows an embodiment of receiving a store code in a virtual button application according to the present disclosure.

FIG. 5 shows an embodiment of receiving a store code in a virtual button application according to the present disclosure.

A screen 510 shows a background screen of a user device 300. When an icon of a virtual button application is selected and executed in the user device 300, a display unit of the user device 300 may display an intro screen as shown on a screen 520. Then, the user device 300 may receive information related to a specific store from the user, and/or the user device 300 may receive a store code from a store Bluetooth signal generator 500. Herein, when receiving the store code, the user device 300 may display a screen as shown in a screen 530. Referring to the screen 530, the display unit of the user device 300 may display a statement of, "receiving a store name in progress." Then, when receiving the store code, the user device 300 may display virtual button information or interface of the store corresponding to the store code as shown in screen 540. When a server 200 does not store or cannot find virtual button information of the store corresponding to the store code, the server 200 may transmit to the user device 300 virtual button information or interface of a basic format stored in the server 200. Virtual buttons may be configured with services frequently required by a user such as, "Please, come here," "Please, bring me the menu," "I need a table setting," etc.

The situation that the user device 300 is able to receive a signal from an apparatus of a specific store by using a near field communication module are described above. However, it can be happed that a store code has been changed or a store code cannot be received. Since a user does not continuously stay at a specific store, the user device 300 may recheck a store code at every preset time interval and transmit to the server information that a store code has been changed or a store code cannot be received. In other words, when the user device 300 receives a store code from a store Bluetooth signal generator 500 or by using various methods while the virtual button application is running, the user device 300 may set or determine as a check-in state and maintain the check-in state for a preset time. In addition, the user device 300 may check a store code after elapsing the preset time. Herein, when the user device 300 is positioned out of a range capable of receiving a store code, the user device 300 may request to the server 200 for releasing the check-in state and the server 200 may release the check-in state so that virtual button information of the corresponding store may not be provided.

Figure 6:
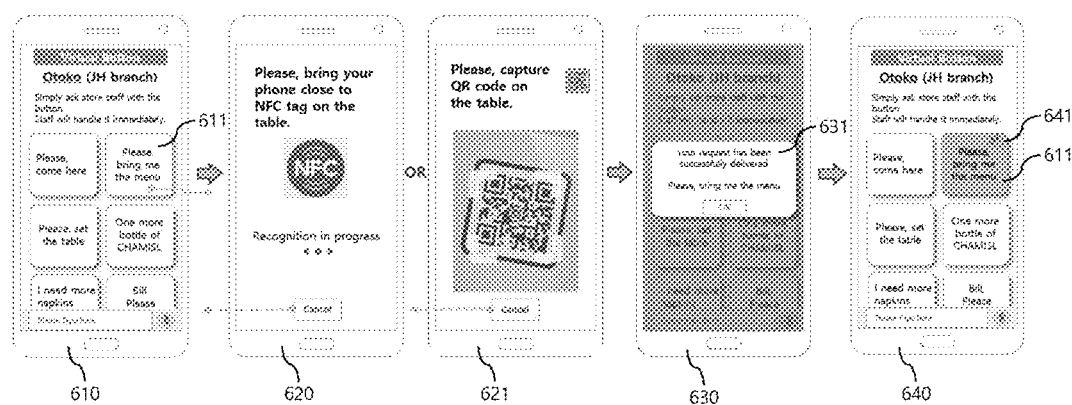
FIG. 6 shows an embodiment of requesting service by using a virtual button application according to the present disclosure.

FIG. 6 shows an embodiment of requesting a service by using a virtual button application according to the present disclosure.

In an interface 610, a user may select at least one specific button 611 among virtual buttons displayed on the user device 300. For example, the button 611 may be a button including a service request of, 'Please, bring me the menu.' The user device 300 may display an NFC tagging waiting screen after at least one of the virtual buttons 611 has been selected in the virtual button application as shown in interface 620. In addition, the user device 300 may display a cancel button together in the interface 620, although such is not required. When the user selects the cancel button, the user device 300 may return to an interface displaying a virtual button list, such as the interface 610.

Alternatively, as shown in interface 621, the user device 300 may provide an interface for scanning or capturing a QR code instead of NFC tagging with a paging button 400 when a specific button is selected. For example, the QR code may be provided at or near a table of the store, or on one side of or around the paging button 400. When the paging button 400 or the user device 300 does not have the NFC function, an image of the QR code may be used. In addition, the QR code may include a table ID information.

The user device 300 may transfer a signal or a message corresponding to the selected button and provide an interface 630 notifying that the transmission was completed or showing the status of the request corresponding to the selected button after performing the NFC tagging with the paging button 400 or capturing the QR code according to screen 620 or 621. The user device 300 may display a message window 631 that representing or showing that a service request corresponding to the selected button has been transmitted. Then, the user device 300 may change the color of the selected button 611 and non-selected buttons as shown in an interface 640 so that the selected button 610 can be distinguished from the non-selected buttons. According to various embodiments, the user device 300 may additionally output an animation effect 641 representing that the service request of the selected button 611 is in process.

In addition, according to some embodiments, the user device 300 may directly display the screen or interface 640 after the interfaces 620 or 621 without providing the interface 630.

Figure 7:
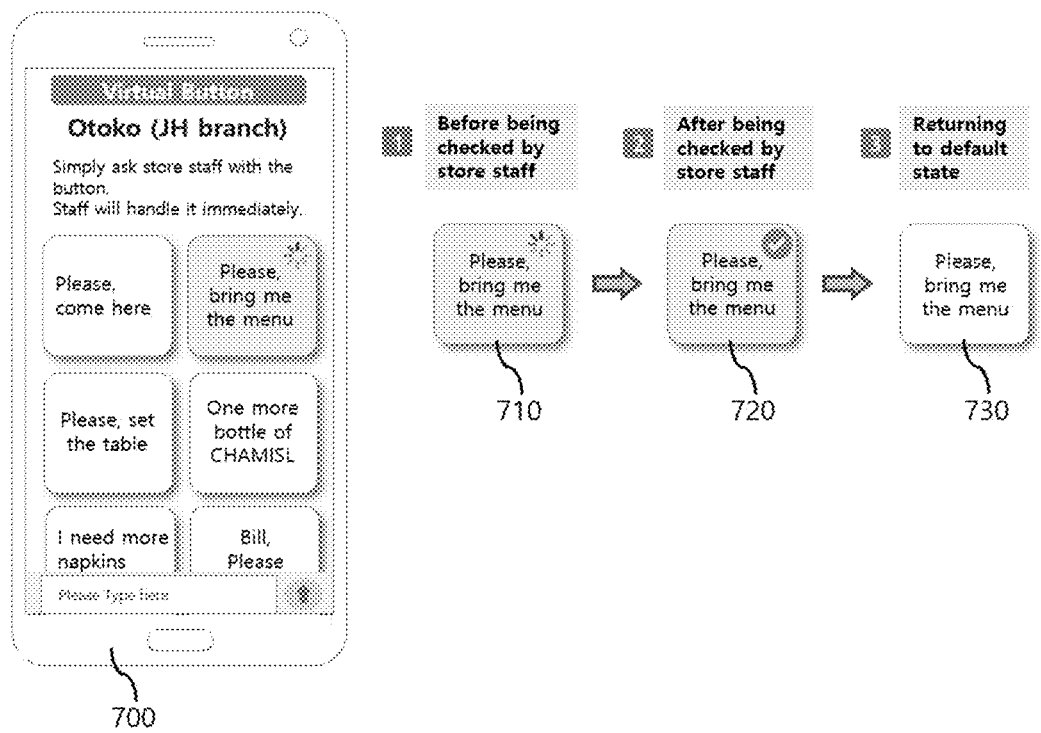
FIG. 7 shows exemplary embodiments of a selected button among virtual buttons according to the present disclosure.

FIG. 7 shows exemplary embodiments of a selected button among virtual buttons according to the present disclosure.

As shown in an interface 700 of FIG. 7, when a specific virtual button is selected in a virtual button list displayed in the user device 300, the user device 300 may differently display a part of the selected button. As an example, as shown in one example of the selected virtual button 710, the user device 300 may additionally output an animation effect wherein a part of the selected button is changed in at least one of a shape or color according to a time flow or the status of the service request. The animation effect may be output until a store staff checks or acknowledges the transferred request (for example, "Please, bring me the menu.") When the store staff checks or acknowledges the transferred request, the user device 300 may display a sign on a part of the virtual button indicating that the store staff has checked the user's request as shown in an example of the selected virtual button 720. Then, the user device 300 may display or output the selected virtual button as a virtual button in a default or initial state as shown in an example of the virtual button 730 after elapsing a preset time.

Figure 8:
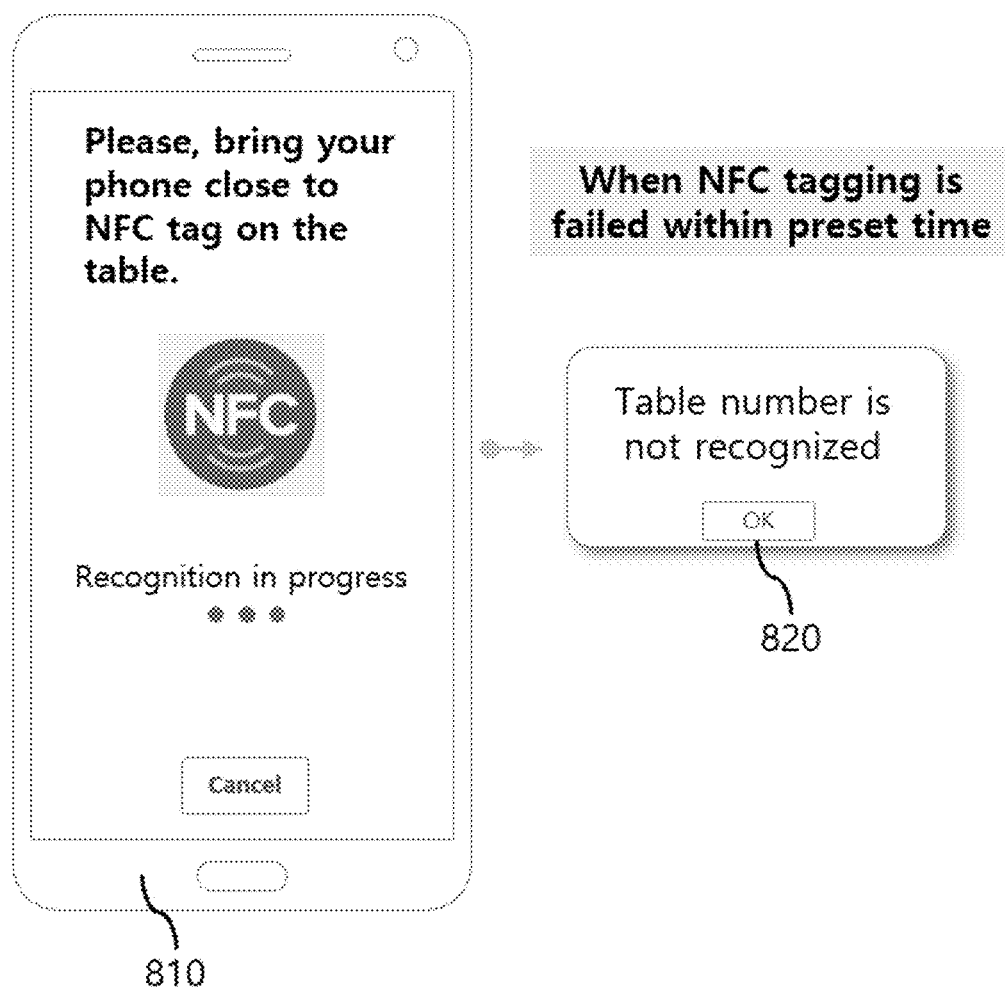
FIG. 8 shows an exemplary embodiment when NFC tagging is failed in a virtual button application according to the present disclosure.

FIG. 8 shows an exemplary embodiment when NFC tagging has failed in a virtual button application according to the present disclosure.

When a virtual button is selected in the virtual button application, the user device 300 may receive information of a paging button ID corresponding to a table number by performing NCF tagging with the paging button 400 installed on the table or by scanning the QR code corresponding to the table. Herein, the user device 300 may display a screen or interface 810 showing instructions for NFC tagging or the status of NFC tagging on the display unit. However, when the user device 300 does not receive information through NFC tagging within a preset time, the user device 300 may display a NFC tagging failure notice message 820.

Figure 9:
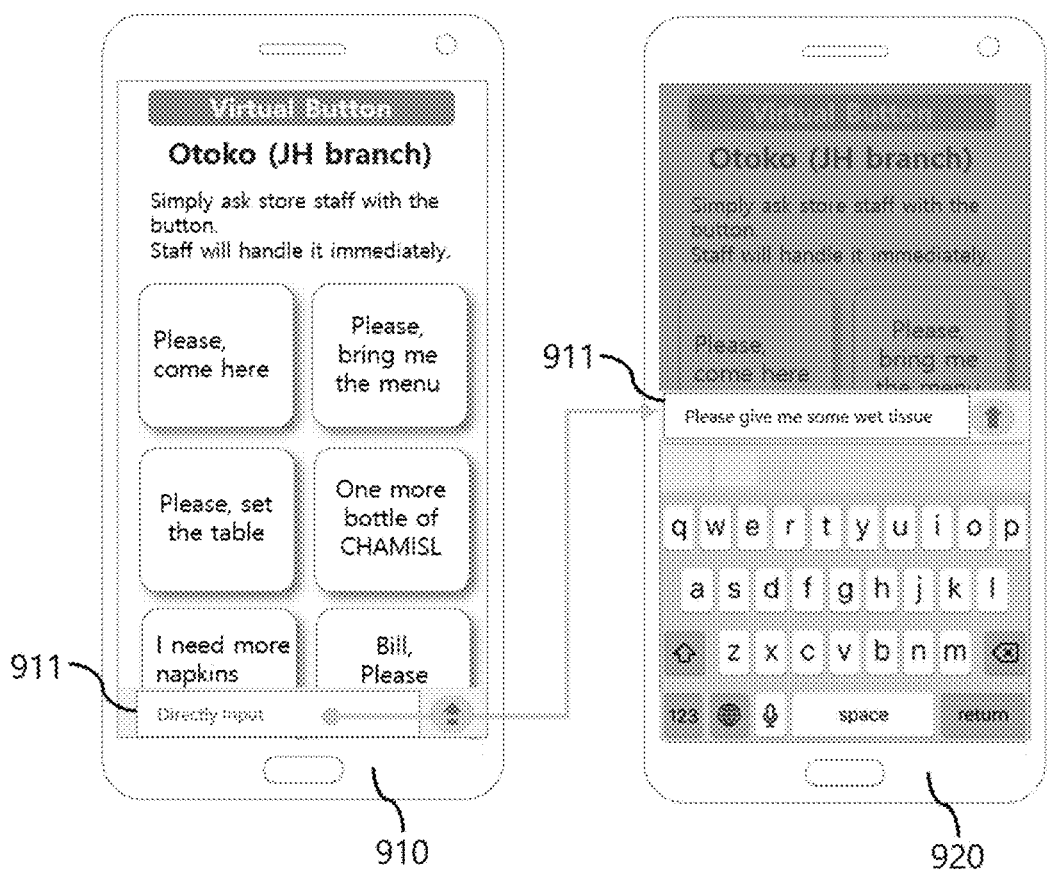
FIG. 9 shows a user interface that a user can request service through a virtual button application according to the present disclosure.

FIG. 9 shows a user interface that a user can request service through a virtual button application according to the present disclosure.

An interface or screen 910 of a virtual button list may include virtual buttons and/or an input interface or window 911 for directly receiving user requests and transferring the input requests. When a user clicks or touches inside or near the input window 911, a key pad may be displayed on the screen of the user device 300 as shown on the interface 920. The input window 911 may be provided for receiving user requests inputted from the user when desired user requests is not present in a virtual button list.

In certain embodiments of the present disclosure, an interface or message directly inputted from the user may be input by using a keypad and/or microphone. For example, a user may press the input window 911 for a preset time or longer so as to enter into a voice receiving mode being capable of receiving a voice input. Alternatively, the user device 300 may provide a specific button for a voice input mode that may be displayed within the input window 911 or in the interface 910. In addition, the user may activate or enter into a voice receiving mode by using various methods. In the voice input mode, what the user says may be input to the user device. Then, the user message input by using the input window 911 or by the microphone may be transmitted to a server after the paging button ID has been received. In addition, according to various embodiments, the user message input by using the microphone may be displayed in the user device 300, for example, but not limited to, an area other than the input window 911.

Figure 10:
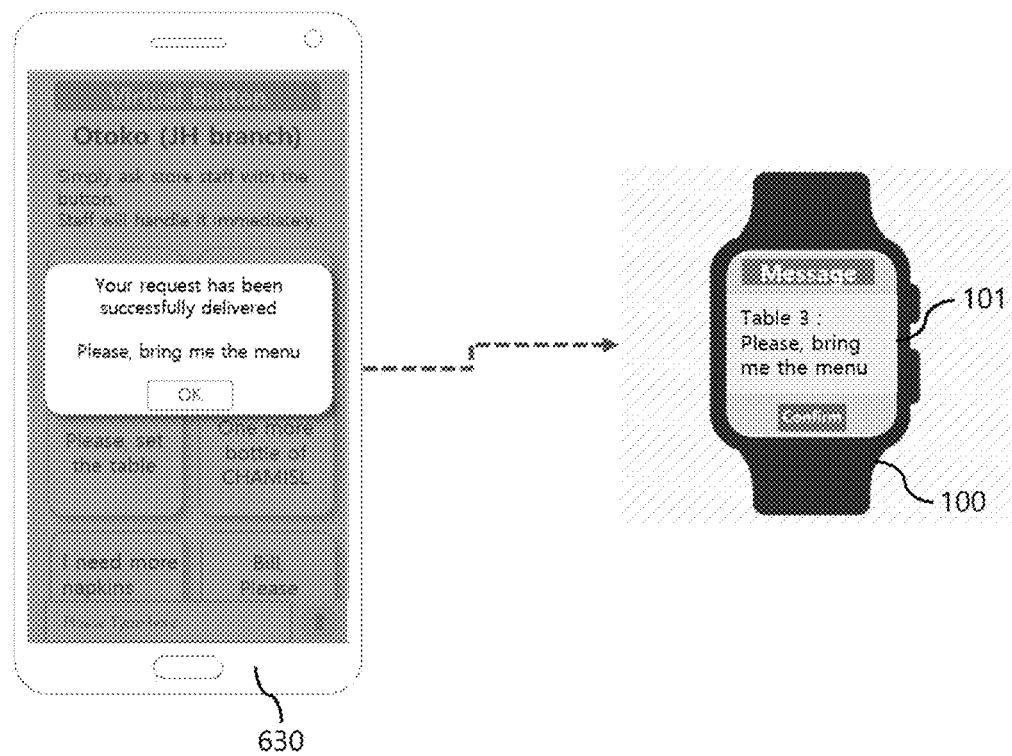
FIG. 10 shows an exemplary embodiment of operation of a staff device according to the present disclosure.

FIG. 10 shows an exemplary embodiment of operation of a staff device according to the present disclosure.

An interface 630 may provide a message or screen showing that a virtual button of "Please, bring me the menu," is selected by the user among virtual buttons in the user device 300 and the information of the selected virtual button has been transferred to the staff device 100. Herein, a message window notifying that the transmission of the request has been completed may be displayed on the user device 300. Herein, one or both of the table number and the user requests may be displayed on a screen 101 the staff device 100.

In certain embodiments, when the staff device 100 receives multiple virtual button signals, the screen 101 of the staff device 100 may display multiple virtual button signals in a list according to a predetermined order, for example, but not limited to, an occurrence order. Then, the store staff may check by selecting or touching a specific requirement message from the list and may sequentially check other messages.

Then, the staff device 100 may provide a, "Confirm," button shown in a lower part of the screen 101 in FIG. 10 so that the user can select or touch the "Confirm" button to remove a corresponding service request message when a response for customer service request has been completed.

Figure 11:
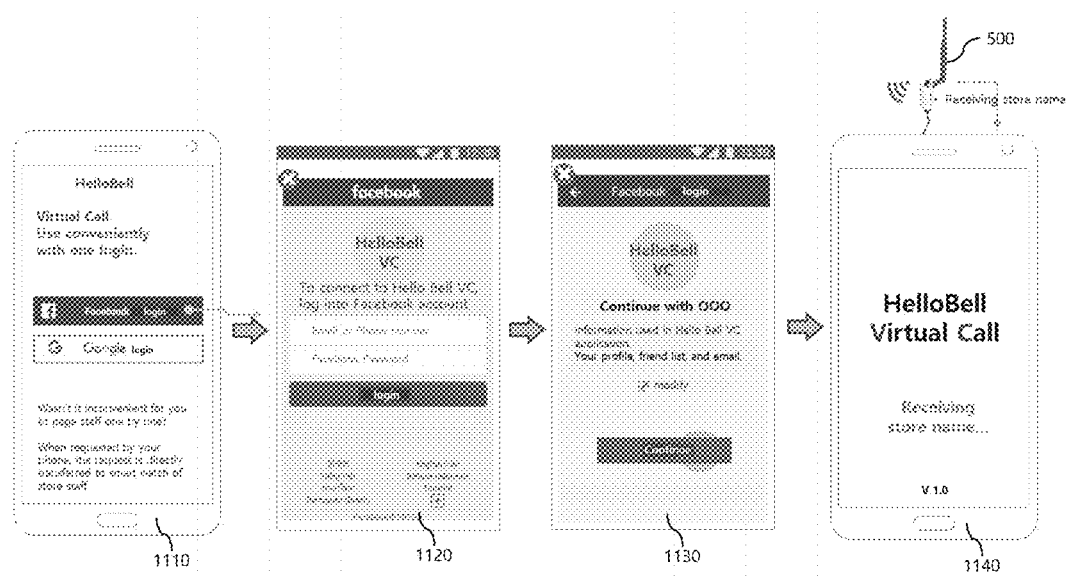
FIGS. 11 and 12 show exemplary embodiments of log-in operation according to the present disclosure.
Figure 12:
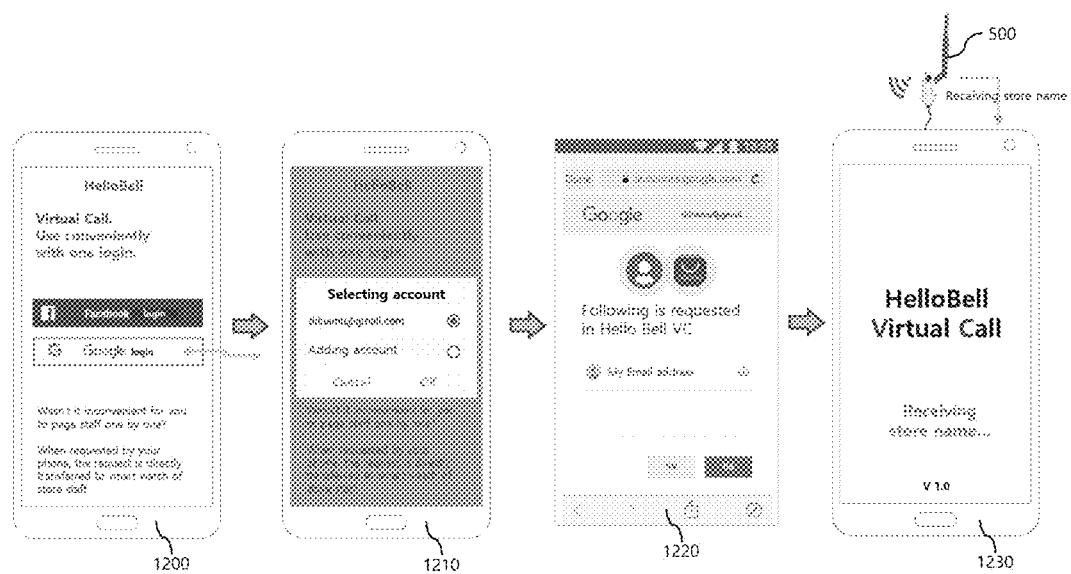

FIGS. 11 and 12 show exemplary embodiments of log-in operation according to the present disclosure.

A process of log-in may be performed in the user device 300 to execute the virtual button application. In an interface 1110, the virtual button application may perform log-in operation by using an account stored in a server which may be the server 200 or another server. An interface 1120 may provide or display an input window for inputting an ID and password for accessing the server. In the interface 1130, when the user whom is a registered member or stored in the server is authenticated, the virtual button application may proceed to the next operation by using the information stored on the server. The user device 300 may receive a store name as shown in the interface 1140. The user device 300 may obtain the store name by receiving a beacon signal generated by a Bluetooth signal generator installed within or near the store.

Similar to FIG. 11, FIG. 12 illustrate an exemplary embodiment of a process of log-in for executing a virtual button application according to the present disclosure.

An interface 1200 may provide an option that a user can select a server type (for example, Google) for logging-in that is not a server operated by the store. The user device 300 may display a selection list for selecting an account associated with the sever type selected by the user as shown in an interface 1210. Herein, the selection list may display a user account ID that is currently logged-in and pre-stored in the user device 300. When the user selects a user account in the selection list and the user proceeds with the consent process of personal information utilization as shown in an interface 1220, the user device 300 may receive the store name as shown in an interface 1230 when.

Figure 13:
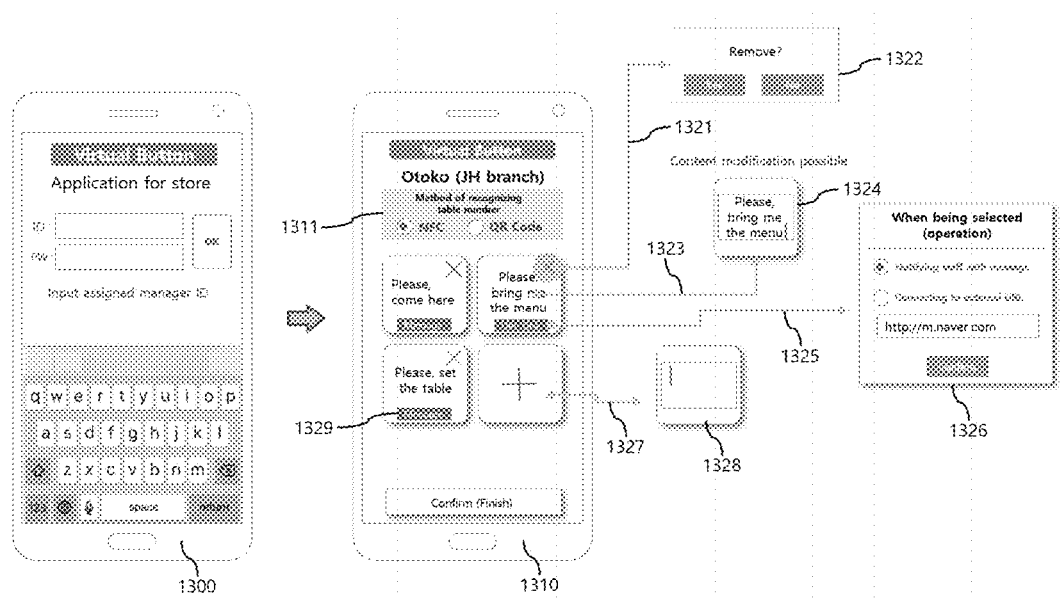
FIG. 13 shows an exemplary embodiment of setting a virtual button in a store according to the present disclosure.

FIG. 13 shows an exemplary embodiment of setting a virtual button in a store according to the present disclosure.

In the embodiment of a virtual button application according to the present disclosure, a default virtual button list that is fundamentally provided regardless of stores may be present. In addition, a user may transmit a virtual button signal to a store by using a virtual button that is fundamentally provided by accessing the virtual button application. However, according to various embodiments, each store may change or customize service requests for each virtual button. For this purpose, the server 200 may provide a input program for a store, for example, customization or edit program, to store devices.

Referring to FIG. 13, as shown in an interface 1300, a store device may display a log-in screen for the store input program. An input ID and password may be a store ID and password preset and assigned from the server 200.

When the log-in process is completed in the interface 1300, the store device, as shown in an interface 1310, may disclose a virtual button editing screen. According to log-in information, a store information (for example, store code, store name, address information, etc) may be displayed on the screen of the store device together. In addition, in the interface 1310 of the store device, a set area 1311 for setting an input method of a table number may be displayed with the virtual button editing screen.

In addition, in the store input program for the store device, interfaces for newly adding or removing a virtual button to or from the virtual button editing screen may be available. For example, by selecting an, 'X,' mark 1321 disposed in the interface 1310, an interface 1322 may provide or display a message window confirming or inquiring whether or not to remove the selected virtual button. In addition, when a text displaying area include in a virtual button is selected as shown in a case 1323, an interface 1324 may provide or display an input window for changing the text included in the selected virtual button, and the store may change the text or an available service request included in the selected virtual button.

In addition, the virtual button editing screen or program may provide tools or interfaces that the store can set or change depending on the operational performance of when a virtual button is selected from the user. An interface 1325 may provide an area displaying an operation type that the store can select. In the exemplary embodiment, when a store manager may touch the interface 1325, the store input program may provide an interface 1326 that the store manage can select operation to be performed when the corresponding virtual button has been selected such as, "Notify staff of a message" and "Connecting to external URL." For example, the, "Connecting to external URL," may be an item or function of supporting an external URL displaying a menu image or any other data to be displayed on the user device 300 instead of sending a staff a message in association with, "Please, bring me the menu." In addition, functional information that is selected according to the above may be displayed on a part 1329 of the virtual button. The part 1329 may not be displayed on the user device 300 and may be only displayed on the virtual button editing screen.

In addition, a button or interface 1327 may provide an area with a, "+" mark for adding a virtual button. Accordingly, in the virtual button editing screen, when the button or interface 1327 is selected, the virtual button editing program or application may provide or display a new input window 1328 for adding a new virtual button. The staff manager may set or configure requests or requirements corresponding to the newly added virtual button on the new input window 1328.

Although some exemplary embodiments of the present disclosure illustrate examples that a paging button is used in restaurants, the paging button may be used or implemented in various places such as, for example, but not limited to, sanatoriums, hospitals, schools, industries, etc. In other words, when a paging button is used in the above described places other than restaurants, requests or requirement contents included in the virtual buttons can be changed. For this, a server may provide a virtual button editing program to a person or companies in the other fields and the editing program may correspond to 70 of FIG. 1.

When a paging button according to an embodiment of the present disclosure is used in a sanatorium, the sanatorium may change request or requirement input in a virtual button to, "Emergency situation," "Request for a meal," etc. by using the editing program. As described above, according to various embodiments of the present disclosure, a virtual button application may support to provide a service customized to a place where the application is used by changing request or requirement contents corresponding to each button.

The description suggests the best mode of the present invention to provide an example that explains the present invention and also enables one skilled in the art to manufacture and use the present invention. The specification drafted as such is not limited to detailed terms suggested in the specification. Accordingly, it will be apparent to those skilled in the art that various modifications, changes, and variations may be made in the example without departing from the scope of the invention. For example, in order to achieve the effect intended by the present invention, it is to be noted that all the functional blocks shown in the attached drawing may not be needed to achieve the effect desired by the present disclosure and even that case may be included in the technical scope of the present disclosure defined by the appended claims.

DESCRIPTION OF THE REFERENCE NUMERALS IN THE DRAWINGS

100: staff device
200: server
210: server communication unit
220: storage unit
230: control unit
300: user device
310: communication unit
320: image capturing unit
330: display unit
340: input unit
350: storage unit
360: control unit
400: paging button
500: store Bluetooth signal generator

The invention claimed is:

1. A method of communicating devices using virtual buttons, comprising:
transmitting, by a user device, a store code to a server storing a plurality of sets of virtual buttons and a plurality of store codes, each set of the plurality of sets of virtual buttons corresponding to a respective store code;
receiving, by the user device, a set of virtual buttons corresponding to the transmitted store code from the server, wherein each virtual button of the set of virtual buttons has a corresponding service request and the set of virtual buttons comprises one or more service requests to be transmitted to a staff device, the set of virtual buttons including a virtual button for requesting a bill, a virtual button for calling a staff, a virtual button for requesting a menu, and a virtual button for ordering food;
providing, by the user device, an interface configured to receive a location identifier and button selection input selected by a user among the set of virtual buttons received from the server, and transmitting, by the user device, the location identifier and the button selection input to the server so that the server can transmit the location identifier and the button selection input to the staff device; and
after the user device receives the button selection input selected by the user, changing, by the user device, a color or a shape of a virtual button selected by the user with an animation effect that is output until the user device receives from the staff device a confirmation of receipt of a service request corresponding to the virtual button selected by the user in a state that both the virtual button selected by the user and virtual buttons that are not selected are simultaneously displayed on the interface provided by the user device, and displaying, on at least a part of the virtual button selected by the user among the set of virtual buttons, a status of a requested service corresponding to the virtual button selected by the user according to a response of the staff device to the service request corresponding to the virtual button selected by the user, wherein when the user device receives from the staff device the confirmation of the receipt of the service request corresponding to the virtual button selected by the user, the user device displays on the interface a message indicating that a staff has checked the service request corresponding to the virtual button selected by the user.

2. The method of claim 1, wherein the location identifier is a table number.

3. The method of claim 1, further comprising receiving, by the user device, the location identifier by performing wireless communication tagging or scanning a machine-readable code.

4. The method of claim 1, further comprising transmitting, by a paging button, the location identifier to the user device.

5. The method of claim 1, further comprising displaying, by the user device, a screen requesting a wireless communication tagging, and receiving, by the user device, the location identifier or a paging button identifier by performing the wireless communication tagging with a paging button.

6. The method of claim 1, further comprising displaying, by the user device, a screen requesting to scan a machine readable code associated with the location identifier, and receiving, by the user device, the location identifier from a paging button when the machine readable code is scanned.

7. The method of claim 1, further comprising:
transmitting, by a paging button, to the user device a signal including the store code or/and the location identifier; and
transmitting, by the user device, to the server the button selection input and the location identifier when one of the virtual buttons is selected by a user.

8. The method of claim 1, further comprising displaying or providing, by the user device, the virtual buttons that the user can select and an interface enabling a user to input a service request by typing or with a voice.

9. The method of claim 1, wherein the server provides an editing program for editing the virtual buttons, wherein the editing program includes an interface for selecting one among a first operation sending a message to the staff device and a second operation connecting to an external Uniform Resource Locator (URL) so that the selected one of the first and second operations is associated with one of the virtual buttons.

10. The method of claim 1, wherein the server provides an editing program for editing the virtual buttons, wherein the editing program includes one or more of selecting between NFC tagging or QR code recognition as a method of recognizing the location identifier, changing service requests corresponding to the virtual buttons, adding or removing one or more of the virtual buttons, and setting the service requests and the service related requests corresponding to the virtual buttons.

11. A system for communicating devices requesting a service using virtual buttons, comprising:
a user device including a processor configured to:
transmit a store code to a server and receive a set of virtual buttons corresponding to the store code from the server, wherein the server stores a plurality of sets of virtual buttons and a plurality of store codes, each set of the plurality of sets of virtual buttons corresponding to a respective store code, wherein each virtual button of the set of virtual buttons has a corresponding service request and the set of virtual buttons comprises one or more service requests to be transmitted to a staff device, the set of virtual buttons including a virtual button for requesting a bill, a virtual button for calling a staff, a virtual button for requesting a menu, and a virtual button for ordering food, provide an interface configured to receive a location identifier and button selection input selected by a user among virtual buttons received from the server, transmit the location identifier and the button selection input to the server so that the server can transmit the location identifier and the button selection input to the staff device, and after the user device receives the button selection input selected by the user, change a color or a shape of a virtual button selected by the user with an animation effect that is output until the user device receives from the staff device a confirmation of receipt of a service request corresponding to the virtual button selected by the user in a state that both the virtual button selected by the user and virtual buttons that are not selected are simultaneously displayed on the interface provided by the user device, and display, on at least a part of the virtual button selected by the user among the set of virtual buttons, a status of a requested service corresponding to the virtual button selected by the user according to a response of the staff device to the service request corresponding to the virtual button selected by the user, wherein when the user device receives from the staff device the confirmation of the receipt of the service request corresponding the virtual button selected by the user, the user device displays on the interface a message indicating that a staff has checked the service request corresponding the virtual button selected by the user.

12. The system of claim 11, wherein the location identifier is a table number.

13. The system of claim 11, further comprising a paging button configured to transmit the location identifier to the user device.

14. The system of claim 11, further comprising a paging button configured to perform wireless communication tagging, wherein the user device is configured to display a screen requesting the wireless communication tagging, and receive the location identifier by performing the wireless communication tagging with the paging button.

15. The system of claim 11, further comprising a machine readable code associated with the location identifier, wherein the user device is configured to display a screen requesting to scan the machine readable code, and receive the location identifier from the paging button when the machine readable code is scanned.

16. The system of claim 11, further comprising a paging button configured to transmit to the user device a signal including the store code and/or the location identifier, wherein the user device is configured to transmit to the server the button selection input and the location identifier when one of the virtual buttons is selected by a user.

17. The system of claim 11, wherein the user device is configured to display the virtual buttons that the user can select and provide an interface enabling a user to input a service request by typing or with voice.

18. The system of claim 11, wherein the server provides an editing program for editing the virtual buttons, wherein the editing program includes an interface for selecting one among a first operation sending a message to the staff device and a second operation connecting to an external Uniform Resource Locator (URL) so that the selected one of the first and second operations is associated with one of the virtual buttons.

19. The system of claim 11, wherein the server is configured to provide an editing program for editing the virtual buttons, wherein the editing program includes one or more of selecting between NFC tagging or QR code recognition as a method of recognizing the location identifier, changing service requests corresponding to the virtual buttons, adding or removing one or more of the virtual buttons, and setting the service requests and the service related requests corresponding to the virtual buttons.

* * * * *